US012624220B2

(12) United States Patent
Arai

(10) Patent No.: US 12,624,220 B2
(45) Date of Patent: May 12, 2026

(54) COMPOSITION AND CURED PRODUCT THEREOF

(71) Applicant: DENKA COMPANY LIMITED, Tokyo (JP)

(72) Inventor: Toru Arai, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 670 days.

(21) Appl. No.: 18/015,484

(22) PCT Filed: Jul. 13, 2021

(86) PCT No.: PCT/JP2021/026324
§ 371 (c)(1),
(2) Date: Jan. 10, 2023

(87) PCT Pub. No.: WO2022/014599
PCT Pub. Date: Jan. 20, 2022

(65) Prior Publication Data

US 2023/0287222 A1 Sep. 14, 2023

(30) Foreign Application Priority Data

Jul. 15, 2020 (JP) ................................ 2020-121683
May 20, 2021 (JP) ................................ 2021-085708

(51) Int. Cl.

| | |
|---|---|
| ***C08F 2/46*** | (2006.01) |
| ***C08F 2/50*** | (2006.01) |
| ***C08F 4/642*** | (2006.01) |
| ***C08F 4/6592*** | (2006.01) |
| ***C08F 210/02*** | (2006.01) |
| ***C08F 210/14*** | (2006.01) |
| ***C08F 212/08*** | (2006.01) |
| ***C08F 212/36*** | (2006.01) |
| ***C08F 222/40*** | (2006.01) |
| ***C08G 61/04*** | (2006.01) |
| ***C08K 5/14*** | (2006.01) |
| ***C08L 71/12*** | (2006.01) |
| ***C09D 4/06*** | (2006.01) |
| ***C09D 123/08*** | (2006.01) |
| ***H01B 3/44*** | (2006.01) |

(52) U.S. Cl.
CPC .............. *C09D 4/06* (2013.01); *C08F 4/6428* (2013.01); *C08F 4/65927* (2013.01); *C08F 210/02* (2013.01); *C08F 210/14* (2013.01); *C08F 212/08* (2013.01); *C08F 212/36* (2013.01); *C08F 222/40* (2013.01); *C08K 5/14* (2013.01); *C08L 71/12* (2013.01); *C09D 123/0815* (2013.01); *C09D 123/0838* (2013.01); *H01B 3/441* (2013.01); *H01B 3/442* (2013.01); *C08L 2203/20* (2013.01); *C08L 2312/00* (2013.01); *C08L 2314/06* (2013.01)

(58) Field of Classification Search
CPC .... C08F 212/08; C08F 212/36; C08F 4/6428; C08F 4/65927; C08F 4/34; C08F 210/02; C08F 210/14; C08F 210/08; C08F 222/40; C08F 2500/02; C08F 2500/01; C08F 2500/25; H01B 3/442; H01B 3/441; C08L 71/12; C08L 23/0838; C08L 23/22; C08L 9/00; C08L 53/02; C08L 2312/00; C08L 2203/20; C08L 2314/06; C09D 5/00; C09D 4/06; C09D 123/0838; C09D 123/0815; C09D 125/08; C09D 109/00; C08K 5/14
USPC .......................... 522/161, 157, 150, 1; 520/1
See application file for complete search history.

(56) References Cited

U.S. PATENT DOCUMENTS

| | | | | |
|---|---|---|---|---|
| 3,960,737 | A | 6/1976 | Kawanishi | |
| 5,608,009 | A | 3/1997 | Machida et al. | |
| 6,500,535 | B1 | 12/2002 | Yamada et al. | |
| 6,527,984 | B1 | 3/2003 | Ishimatsu | |
| 12,359,049 | B2 * | 7/2025 | Arai | B32B 15/082 |
| 2004/0039127 | A1 | 2/2004 | Amou et al. | |
| 2008/0249235 | A1 | 10/2008 | Kaneko et al. | |
| 2011/0040038 | A1 | 2/2011 | Arai et al. | |
| 2014/0357798 | A1 | 12/2014 | Shimizu et al. | |
| 2018/0258324 | A1 | 9/2018 | Tochihira et al. | |

(Continued)

FOREIGN PATENT DOCUMENTS

| | | |
|---|---|---|
| CN | 108779206 A | 11/2018 |
| CN | 110461891 A | 11/2019 |

(Continued)

OTHER PUBLICATIONS

Arai et al, JP 2010280771 Machine Translation, Dec. 16, 2010 (Year: 2010).*

(Continued)

*Primary Examiner* — Jessica Whiteley
(74) *Attorney, Agent, or Firm* — OLIFF PLC.

(57) ABSTRACT

A varnish having low viscosity and a cured product thereof having a high degree of cross-linking, exhibiting excellent low dielectric properties and mechanical properties at high temperature, and a low coefficient of linear thermal expansion are provided. A varnish comprising an olefin-aromatic vinyl compound-aromatic polyene copolymerized oligomer satisfying specific conditions, one or more selected from the following (a) to (c), and (d) a solvent: (a) a curing agent; (b) one or a plurality of resins selected from a hydrocarbon-based elastomer, a polyphenylene ether-based resin, an olefin-aromatic vinyl compound-aromatic polyene copolymer, and an aromatic polyene-based resin; and (c) a polar monomer; and a cured product of the varnish.

21 Claims, No Drawings

(56) References Cited

U.S. PATENT DOCUMENTS

| | | | |
|---|---|---|---|
| 2019/0062541 A1 | 2/2019 | Saito et al. |
| 2021/0108073 A1 | 4/2021 | Kawabe et al. |
| 2022/0049034 A1 | 2/2022 | Kawabe et al. |

FOREIGN PATENT DOCUMENTS

| | | | | |
|---|---|---|---|---|
| DE | 2 338 249 | A1 | | 2/1974 |
| EP | 1 094 474 | A2 | | 4/2001 |
| GB | 2 039 789 | A | | 8/1980 |
| JP | S52-31272 | B2 | | 8/1977 |
| JP | H06-192392 | A | | 7/1994 |
| JP | H09-040709 | A | | 2/1997 |
| JP | H09-309925 | A | | 12/1997 |
| JP | H11-60645 | A | | 3/1999 |
| JP | 2002-179869 | A | | 6/2002 |
| JP | 2003-026730 | A | | 1/2003 |
| JP | 2004-087639 | A | | 3/2004 |
| JP | 2004-175834 | A | | 6/2004 |
| JP | 2009-161743 | A | | 7/2009 |
| JP | 2010-280860 | A | | 12/2010 |
| JP | 2010280771 | A | * | 12/2010 |
| JP | 2018-039995 | A | | 3/2018 |
| KR | 20070110525 | A | | 11/2007 |
| KR | 20110010724 | A | | 2/2011 |
| KR | 20140044930 | A | | 4/2014 |
| KR | 20170090479 | A | | 8/2017 |
| KR | 20180104114 | A | | 9/2018 |
| KR | 20190114808 | A | | 10/2019 |
| WO | 94/10216 | A1 | | 5/1994 |
| WO | 2020/067336 | A1 | | 4/2020 |
| WO | 2021/112088 | A1 | | 6/2021 |

OTHER PUBLICATIONS

Oct. 26, 2023 Office Action issued in Chinese Patent Application No. 202180039735.3.

Oct. 25, 2023 extended Search Report issued in European Patent Application No. 21841529.7.

May 4, 2023 Office Action issued in Chinese Patent Application No. 202180039735.3.

Sep. 21, 2021 International Search Report issued in Patent Application No. PCT/JP2021/026324.

Dong, J.Y., et al., "Synthesis of Linear Polyolefin Elastomers Containing Divinylbenzene Units and Applications in Cross-Linking, Functionalization, and Graft Reactions," Macromolecules, 2003, vol. 36, No. 16, pp. 6000-6009.

Oct. 19, 2025 Office Action issued in Korean Patent Application No. 10-2022-7040875.

* cited by examiner

COMPOSITION AND CURED PRODUCT THEREOF

TECHNICAL FIELD

The present invention relates to a composition and a cured product thereof.

BACKGROUND ART

Due to the shift of communication frequency to gigahertz bands and frequency bands higher than those, needs for insulating materials having low dielectric properties have increased. Polyolefins such as polyethylene and aromatic vinyl compound polymers such as polystyrene are known as materials exhibiting excellent low dielectric constant and low dielectric tangent due to having no polar groups in molecular structures. However, due to dependence of the heat resistance on the melting point of crystals or the glass transition temperature, they have a problem in the heat resistance as electric insulator, and due to being thermoplastic resins, they have a problem in a film forming process (Patent Literature 1).

Although fluorine-based resins such as perfluoroethylene have characteristics excellent in low dielectric constant, low dielectric loss and heat resistance, device suitability is low due to difficulty in moldability and film formability. In addition, there is a problem in the adhesive strength with a copper foil of wiring. Meanwhile, although substrates and insulating materials using post-curable resins such as epoxy resins, unsaturated polyester resins, polyimide resins, and phenol resins have been widely used due to the heat resistance and easy handling, improvement is required as insulating materials for high frequencies due to relatively high dielectric constants and dielectric losses (Patent Literature 2).

An electrically insulating material including graft or block copolymer including olefin-based and styrene-based polymer segments has been proposed (Patent Literature 3). The material focuses on the low dielectric constant and low dielectric loss essential to olefin-based or styrene-based hydrocarbon polymers. The production method includes general graft polymerization of commercially available polyethylene and polypropylene with a styrene monomer or a divinylbenzene monomer in the presence of a radical polymerization initiator. Such a method has problems of poor graft efficiency and insufficient uniformity of the polymer. Further, the resulting polymer contains a gel, so that there exist problems of poor processability and filling property. In addition, the material is a thermoplastic resin having insufficient heat resistance, so that an addition of a heat-resistant resin such as 4-methyl-1-pentene is required. Further, it is difficult to use the material in a molding method including applying the material to a predetermined place or filling a predetermined place with the material and then curing the material.

In Patent Literature 4, an insulating layer including a crosslinked structure containing a hydrocarbon compound having a plurality of aromatic vinyl groups as a cross-linking component is described. The cured product of the cross-linking component specifically described in examples is rigid, so that it is presumed that filling with a large amount of filler is difficult.

In Patent Literature 5, a cured product obtained from a specific polymerization catalyst, including an ethylene-olefin (aromatic vinyl compound)-polyene copolymer having specific composition and formulation and a non-polar vinyl compound copolymer, is shown. Although the cured product specifically described in examples of Patent Literature 5 has characteristics including low dielectric constant and low dielectric tangent, it is extremely soft, so that improvement in mechanical strength such as elastic modulus at normal temperature and high temperature is required. For use as thin film insulating materials such as interlayer insulating materials of FPC (flexible printed circuit board) and FCCL (flexible copper clad laminate) and coverlay applications, it is preferable to improve stability in dimensions such as thickness during a mounting process or during use after mounting. In Patent Literature 6, a cured product obtained from the similar specific polymerization catalyst, including an ethylene-olefin (aromatic vinyl compound)-polyene copolymer having specific composition and formulation and a non-polar vinyl compound copolymer is shown. A cured product of a composition containing a similar copolymer is also shown in Patent Literature 7. However, the ethylene-olefin (aromatic vinyl compound)-polyene copolymers described in Patent Literature 5 to 7, have a high molecular weight, so that the viscosity is high when dissolved in a solvent or monomer. Accordingly, when used as a varnish, improvement in the coatability and impregnation may be required. Further, in Patent Literature 5 to 7, no cured product of the ethylene-olefin (aromatic vinyl compound)-polyene copolymer alone or as a main component is described. Further, in Patent Literature 8, although a production method of an ethylene-styrene copolymer oligomer having a low molecular weight is disclosed, description on the production of an ethylene-styrene-divinylbenzene copolymerized oligomer and the use thereof is absent.

CITATION LIST

Patent Literature

Patent Literature 1: Japanese Patent Publication No. 52-31272
Patent Literature 2: Japanese Patent Laid-Open No. 6-192392
Patent Literature 3: Japanese Patent Laid-Open No. 11-60645
Patent Literature 4: Japanese Patent Laid-Open No. 2004-087639
Patent Literature 5: Japanese Patent Laid-Open No. 2010-280771
Patent Literature 6: Japanese Patent Laid-Open No. 2009-161743
Patent Literature 7: Japanese Patent Laid-Open No. 2010-280860
Patent Literature 8: Japanese Patent Laid-Open No. 9-040709

SUMMARY OF INVENTION

Technical Problem

In view of the above-mentioned prior art, it has been required to provide a curable substance suitable for use as a varnish, and a cured product thereof that has a high degree of cross-linking and exhibits excellent low dielectric properties and low water absorption.

Solution to Problem

In other words, the present invention may provide the following aspects.

First, a varnish comprising an olefin-aromatic vinyl compound-aromatic polyene copolymerized oligomer satisfying all of the following conditions (1) to (4), one or more selected from the group consisting of the following (a) to (c), and (d) a solvent.

(1) The number average molecular weight of the copolymerized oligomer is 500 or more and less than 12000, preferably less than 10000, particularly preferably less than 5000.

(2) The aromatic vinyl compound monomer is an aromatic vinyl compound having 8 or more and 20 or less carbon atoms, and the content of the unit of the aromatic vinyl compound monomer is 0 mass % or more and 90 mass % or less, preferably 70 mass % or less.

(3) The aromatic polyene is one or more selected from polyenes having 5 or more and 20 or less carbon atoms and having a plurality of vinyl groups and/or vinylene groups in the molecule, and the content of the vinyl groups and/or the vinylene groups derived from the unit of the aromatic polyene is 1.5 pieces or more and less than 10 pieces per number average molecular weight; and (4) The olefin is one or more selected from olefins having 2 or more and 20 or less carbon atoms, and the total of units of the olefin monomer, the aromatic vinyl compound monomer, and the aromatic polyene monomer is 100 mass %.

(a) A curing agent.

(b) One or a plurality of resins selected from the group consisting of a hydrocarbon-based elastomer, a polyphenylene ether-based resin, an olefin-aromatic vinyl compound-aromatic polyene copolymer, and an aromatic polyene-based resin.

(c) A polar monomer.

Further, a cured product comprising an olefin-aromatic vinyl compound-aromatic polyene copolymerized oligomer satisfying all of the following conditions (1) to (4) may be also provided:

(1) The number average molecular weight of the copolymerized oligomer is 500 or more and less than 12000, preferably 500 or more and less than 10000, particularly preferably 500 or more and less than 5000.

(2) The aromatic vinyl compound monomer is an aromatic vinyl compound having 8 or more and 20 or less carbon atoms, and the content of the unit of the aromatic vinyl compound monomer is 0 mass % or more and 90 mass % or less, preferably 10 mass % or more and 70 mass % or less, or 10 mass % or more and less than 70 mass %.

(3) The aromatic polyene is one or more selected from polyenes having 5 or more and 20 or less carbon atoms and having a plurality of vinyl groups and/or vinylene groups in the molecule, and the content of the vinyl groups and/or the vinylene groups derived from a unit of the aromatic polyene is 1.5 pieces or more and less than 10 pieces per number average molecular weight; and (4) The olefin is one or more selected from olefins having 2 or more and 20 or less carbon atoms, and the total of units of the olefin monomer, the aromatic vinyl compound monomer, and the aromatic polyene monomer is 100 mass %.

Advantageous Effects of Invention

The varnish comprising the olefin-aromatic vinyl compound-aromatic polyene copolymerized oligomer of the present invention has a low viscosity, from which a cured product having excellent low dielectric properties and high mechanical strength (elastic modulus, etc.) at room temperature and particularly at high temperature may be produced. Further, the cured product of the present invention has excellent low dielectric properties, and high mechanical strength (elastic modulus, etc.) at room temperature and particularly at high temperature.

DESCRIPTION OF EMBODIMENT

In the present specification, the term "sheet" also includes the concept of a film. Further, the term "film" described in the specification includes the concept of a sheet. The composition according to the present invention is described in more detail below. In the present specification, the term "composition" includes the concept of a varnish. In other words, among the compositions, those that are in a liquid state, in particular, are described as varnish.

Varnish

A varnish of the present invention comprises an olefin-aromatic vinyl compound-aromatic polyene copolymerized oligomer satisfying all of the following conditions (1) to (4):

(1) The number average molecular weight of the copolymerized oligomer is 500 or more and less than 12000, preferably 500 or more and less than 10000, particularly preferably 500 or more and less than 5000.

(2) The aromatic vinyl compound monomer is an aromatic vinyl compound having 8 or more and 20 or less carbon atoms, and the content of the unit of the aromatic vinyl compound monomer is 0 mass % or more and 90 mass % or less, preferably 10 mass % or more and 70 mass % or less, and still more preferably 10 mass % or more and 60 mass % or less.

(3) The aromatic polyene is one or more selected from the group consisting of polyenes having 5 or more and 20 or less carbon atoms and having a plurality of vinyl groups and/or vinylene groups in the molecule, and the content of the vinyl groups and/or the vinylene groups derived from a unit of the aromatic polyene is 1.5 pieces or more and less than 10 pieces per number average molecular weight.

(4) The olefin is one or more selected from olefins having 2 or more and 20 or less carbon atoms, and the total of the olefin monomer unit, the aromatic vinyl compound monomer unit, and the aromatic polyene monomer unit is 100 mass %.

The varnish of the present invention further comprises: at least one or more selected from the group consisting of:

(a) a "curing agent", (b) "one or a plurality of resins selected from the group consisting of a hydrocarbon-based elastomer, a polyphenylene ether-based resin, an olefin-aromatic vinyl compound-aromatic polyene copolymer, and an aromatic polyene-based resin", and (c) a "polar monomer"; and (d) a solvent.

The olefin-aromatic vinyl compound-aromatic polyene copolymerized oligomer (hereinafter, simply referred to as "oligomer" in some cases) may be obtained by copolymerization of monomers of the olefin, the aromatic vinyl compound, and the aromatic polyene. As a concept distinguished from the "oligomer", a copolymerized product having a number average molecular weight of 12000 or more is defined as an olefin-aromatic vinyl compound-aromatic polyene copolymer, or simply a "copolymer" in the present specification. From the viewpoint of obtaining an appropriate viscosity as varnish, the varnish and the cured product thereof according to the present invention contain preferably 100 parts by mass or less, more preferably 50 parts by mass or less, still more preferably 20 parts by mass or less, and furthermore preferably none, of the olefin-aromatic vinyl compound-aromatic polyene copolymer relative to 100 parts by mass of the oligomer.

The olefin monomer is one or more selected from α-olefins having 2 or more and 20 or less carbon atoms and cyclic olefins having 5 or more and 20 or less carbon atoms, which is a compound composed of carbon and hydrogen, substantially containing no oxygen, nitrogen, or halogen. Examples of the α-olefins (alpha-olefins) having 2 or more and 20 or less carbon atoms include ethylene, propylene, 1-butene, 1-hexene, 1-octene, 1-decane, 1-dodecane, 4-methyl-1-pentene, and 3,5,5-trimethyl-1-hexene. Examples of the cyclic olefin having 5 or more and 20 or less carbon atoms include norbornene and cyclopentene. The olefin for use is preferably a combination of ethylene and an α-olefin or a cyclic olefin other than ethylene, or ethylene alone. In the case where the olefin is ethylene alone, or the mass ratio α-olefin other than ethylene contained/ethylene is 1/7 or less, more preferably 1/10 or less, the peel strength of the resulting cured product from a copper foil or copper wiring may be favorably increased. Still more preferably, the content of the α-olefin monomer unit other than ethylene contained in the copolymer is 6 mass % or less, most preferably 4 mass % or less, or the olefin is ethylene alone. Further, in a preferred combination of ethylene and an α-olefin other than ethylene, the glass transition temperature of the ethylene-α-olefin-aromatic vinyl compound-aromatic polyene copolymerized oligomer of the finally resulting cured product may be freely adjusted in the range of about −60° C. to −10° C., depending on the type and content of the α-olefin.

The aromatic vinyl compound monomer is an aromatic vinyl compound having 8 or more and 20 or less carbon atoms, and examples thereof include styrene, paramethylstyrene, paraisobutylstyrene, various vinylnaphthalenes, and various vinylanthracenes.

The aromatic polyene monomer is a polyene having 5 or more and 20 or less carbon atoms and having a plurality of vinyl groups and/or vinylene groups in the molecule, being preferably various (ortho, meta, and para) divinylbenzenes or a mixture thereof, and a compound composed of carbon and hydrogen, substantially containing no oxygen, nitrogen, or halogen, having an aromatic vinyl structure such as divinylnaphthalene, divinylanthracene, p-2-propenylstyrene, and p-3-butenylstyrene. Alternatively, a bifunctional aromatic vinyl compound described in Japanese Patent Laid-Open No. 2004-087639, for example, 1,2-bis(vinylphenyl)ethane (abbreviation: BVPE) may be used. Among these, various (ortho-, meta-, or para-)divinylbenzenes, or mixtures thereof are preferably used, and a mixture of meta and paradivinylbenzene is most preferably used. In the present specification, these are referred to as divinylbenzenes. Use of divinylbenzenes as the aromatic polyene is preferred, because the curing efficiency is high in a curing process to achieve easy curing.

Each of the monomers of the olefin, aromatic vinyl compound, and aromatic polyene may further include an olefin containing a polar group such as an oxygen atom, a nitrogen atom, etc., an aromatic vinyl compound containing an oxygen atom, a nitrogen atom, etc., or an aromatic polyene containing an oxygen atom, a nitrogen atom, etc. However, the total mass of the monomers containing these polar groups is preferably 10 mass % or less, more preferably 3 mass % or less, relative to the total mass of the resin composition, and it is most preferable that no monomers containing a polar group be contained. By setting the content to 10 mass % or less, the low dielectric property (low dielectric constant/low dielectric loss) of the cured product obtained by curing the resin composition may be improved.

The number average molecular weight (Mn) of the copolymerized oligomer is 500 or more and less than 12000, preferably 500 or more and less than 10000, and most preferably 500 or more and less than 5000. In the present invention, the number average molecular weight of 500 or more and less than 12000, preferably less than 10000, most preferably less than 5000, means that the molecular weight in terms of standard polystyrene obtained by GPC (gel permeation chromatography) method is in the range.

In the copolymerized oligomer, the content of the vinyl group and/or vinylene group derived from an aromatic polyene unit is 1.5 pieces or more and less than 10 pieces, preferably 2 pieces or more and less than 7 pieces, per number average molecular weight. With a content of the vinyl group and/or vinylene group of less than 1.5 pieces, the cross-linking efficiency is low, and it becomes difficult to obtain a cured product having a sufficient cross-linking density. The content of the vinyl group derived from the aromatic polyene unit (divinylbenzene unit) per number average molecular weight in the copolymerized oligomer may be obtained by comparing the number average molecular weight (Mn) in terms of standard polystyrene obtained by GPC (gel permeation chromatography) method known to those skilled in the art with the vinyl group content and the vinylene group content derived from the aromatic polymer unit obtained by $^{1}$H-NMR measurement. As an example, in the case where the vinyl group content derived from the aromatic polyene unit (divinylbenzene unit) in the copolymerized oligomer is 3.2 mass % resulting from comparison of the intensity of each peak area obtained by $^{1}$H-NMR measurement, and the number average molecular weight in terms of standard polystyrene by GPC measurement is 2100, the molecular weight of the vinyl group derived from the aromatic polyene unit in the number average molecular weight is 67.5, which is the product of these. The product is divided by 27, which is the formula weight of the vinyl group, to obtain 2.5. That is, the content of vinyl group derived from the aromatic polyene unit per number average molecular weight in the copolymerized oligomer is 2.5 pieces. The attribution of peaks obtained by $^{1}$H-NMR measurement of the copolymerized oligomer is known in literature. Further, a method for obtaining the composition of the copolymerized oligomer from the comparison of the peak areas obtained by $^{1}$H-NMR measurement is also known.

Further, in the specification, the content of the divinylbenzene unit in the copolymerized oligomer is determined from the peak intensity of the vinyl group derived from the divinylbenzene unit (according to $^{1}$H-NMR measurement). That is, from the content of the vinyl group derived from the divinylbenzene unit, the content of the divinylbenzene unit is determined by assuming that one piece of vinyl group is derived from one piece of divinylbenzene unit in the copolymer.

From a copolymerized oligomer which satisfies the other conditions described above and has a number average molecular weight of less than 12000, preferably less than 10000, and most preferably less than 5000, a cured product having a higher degree of cross-linking (cross-linking density) may be obtained, compared to the case of using a copolymer having a higher molecular weight than the oligomer. The degree of cross-linking may be determined, for example, by placing a cured product such as sheet in xylene, heating to the boiling point, collecting after refluxing for 1 hour, and determining presence or absence of dissolution or swelling of the sheet of cured product (referred to as cured sheet in some cases). The degree of the cross-linking is determined to be higher as the cured product is less dissolved or less swollen. Further, the mechanical properties at high temperature of the cured product of the present copolymerized oligomer may be improved. Specifically, the cured product may exhibit a higher storage elastic modulus at high temperature than using a copolymer having a higher molecular weight. Even a cured product of the composition containing other resins or monomers in addition to the copolymerized oligomer may have a higher storage elastic modulus than the case of using a copolymer having a higher molecular weight in comparison with similar formulation. Thereby, for example, the durability and dimensional stability of a single-layer or multi-layer CCL, FCCL, interlayer insulating layer, or interlayer adhesive layer including the cured product in a solder reflow process may be improved. Specifically, the cured product of the present invention may exhibit a storage elastic modulus at 300° C. of $1\times10^6$ Pa or more, preferably $2\times10^6$ Pa or more, and most preferably $2.5\times10^6$ Pa or more, in practical aspect.

Further, the cured product may exhibit a lower coefficient of linear thermal expansion (CTE) than in the case of using a higher molecular weight copolymer. Even a cured product of a composition containing other resins or monomers in addition to the copolymerized oligomer may have a lower coefficient of linear thermal expansion (CTE) in comparison with similar formulation.

Considering the use of the cured product, the CTE value preferable for a single-layer or multi-layer CCL, FCCL, interlayer insulating layer, or interlayer adhesive layer is 200 ppm or less, preferably 100 ppm or less, and most preferably 75 ppm or less, in the range of 25 to 150° C. Accordingly, even in the case where an electronic device, substrate, or the like including the cured product is subjected to heat-treatment such as passing through a solder reflow furnace, warpage, deformation, and exudation of the insulating layer may be favorably suppressed.

Further, with the number average molecular weight (Mn) of the copolymerized oligomer of 500 or more and less than 12000, preferably less than 10000, and most preferably less than 5000, the viscosity of the varnish containing the copolymerized oligomer may be easily reduced. Specifically, even in the case of a varnish with a practical concentration of the copolymerized oligomer of 33 mass % or more, the viscosity thereof is easily adjusted to, for example, preferably 2000 mPa·s or less, more preferably 1000 mPa·s or less, and still more preferably 500 mPa·s or less, and most preferably 100 mPa·s or less. The lower the molecular weight of the copolymerized oligomer, the easier it is to reduce the viscosity of the finally obtained varnish, and an effect for enlarging the adjustment range of the formulation to obtain a particularly preferable viscosity of 100 mPa·s or less may be achieved. Having a number average molecular weight of less than 12000, preferably less than 10000, and most preferably less than 5000, the oligomer made into a varnish allows the viscosity thereof to be relatively low. As a result, the varnish may be easily handled, and particularly in the case where a filler is added, increase in the viscosity of the composition may be suppressed. The oligomer has preferable properties different from those of a copolymer having a higher molecular weight. Further, having a low number average molecular weight, the oligomer also has an effect of easy impregnation into non-woven fabrics of glass or other material.

The content of the unit of aromatic vinyl compound monomer contained in the copolymerized oligomer is 0 mass % or more and 90 mass % or less, more preferably 0 mass % or more and 70 mass % or less, or 0 mass % or more and less than 70 mass %, and still more preferably 10 mass % or more and 60 mass % or less. With a content of the unit of aromatic vinyl compound monomer of less than 70 mass %, the glass transition temperature of the cured product of the finally obtained resin composition is lower than approximate room temperature, so that the toughness and elongation at low temperature are favorably improved. With a content of the unit of aromatic vinyl compound monomer of 10 mass % or more, the aromaticity of the copolymerized oligomer is improved, the compatibility with a flame retardant and a filler is improved. As a result, the bleed-out of the flame retardant may be avoided and the effect for improving the filling property of the filler may be achieved. Further, with a content of the unit of aromatic vinyl compound monomer of 10 mass % or more, a cured product of resin composition having high peel strength from copper foil or copper wiring may be also obtained.

In the copolymerized oligomer, the content of the olefin monomer unit is preferably 20 mass % or more, more preferably 25 mass % or more, and most preferably 30 mass % or more. The total of units of the olefin monomer, the aromatic vinyl compound monomer, and the aromatic polyene monomer is 100 mass %. With an olefin monomer unit content of 20 mass % or more, the toughness (elongation) and impact resistance of the finally resulting cured product is improved, resulting in rare occurrence of cracks during curing and rare occurrence of cracks in the cured product during a heat cycle test. In the copolymerized oligomer, the preferred olefin monomer unit content is 90 mass % or less.

In the copolymerized oligomer, preferred specific examples of the olefin-aromatic polyene copolymerized oligomer containing no aromatic vinyl compound monomer unit include an ethylene-divinylbenzene copolymerized oligomer, an ethylene-propylene-divinylbenzene copolymerized oligomer, an ethylene-1-butene-divinylbenzene copolymerized oligomer, an ethylene-1-hexene-divinylbenzene copolymerized oligomer, and an ethylene-1-octene-divinylbenzene copolymerized oligomer.

In the copolymerized oligomer, examples of the olefin-aromatic vinyl compound-aromatic polyene copolymerized oligomer containing an aromatic vinyl compound monomer unit may include, for instance, an ethylene/styrene/divinylbenzene copolymerized oligomer, an ethylene/propylene/styrene/divinylbenzene copolymerized oligomer, an ethylene/1-hexene/styrene/divinylbenzene copolymerized oligomer, and an ethylene/l-octene/styrene/divinylbenzene copolymerized oligomer.

The varnish of the present invention may further comprise one or more selected from the group consisting of:

(a) curing agent;

(b) one or a plurality of resins selected from the group consisting of a hydrocarbon-based elastomer, a polyphenylene ether-based resin, an olefin-aromatic vinyl compound-aromatic polyene copolymer, and an aromatic polyene-based resin; and (c) polar monomer.

Curing Agents

As the curing agent for use in the curable composition of the present invention, a known curing agent that may be conventionally used for polymerization or curing of aromatic polyenes and aromatic vinyl compounds may be used. Examples of such a curing agent include a radical polymerization initiator, a cationic polymerization initiator, and an anionic polymerization initiator, and a radical polymerization initiator may be preferably used. Preferably, the curing agent is an organic peroxide-based (peroxide) or azo-based polymerization initiator, which may be freely selected depending on the application and conditions. Catalogs showing examples of organic peroxides may be downloaded from the following NOF CORPORATION websites.

https://www.nof.co.jp/business/chemical/product01a.html https://www.nof.co.jp/business/chemical/product01b.html https://www.nof.co.jp/business/chemical/product01c.html Examples of the organic peroxide are also described in the catalogs of FUJIFILM Wako Pure Chemical Corporation and Tokyo Chemical Industry Co., Ltd. The curing agent used in the present invention may be obtained from these companies. Further, a known photopolymerization initiator using light, ultraviolet rays, or radiation may also be used as the curing agent. Examples of the curing agent using the photopolymerization initiator include a photo radical polymerization initiator, a photo cationic polymerization initiator, and a photo anionic polymerization initiator. Such a photopolymerization initiator may be obtained from, for example, Tokyo Chemical Industry Co., Ltd. Furthermore, curing may be performed by radiation or electron beam itself. Alternatively, cross-linking and curing may be performed by thermal polymerization of the raw materials contained without a curing agent.

The amount of the curing agent used is not particularly limited, and in general preferably 0.01 to 10 parts by mass relative to 100 parts by mass of the resin composition. It is preferable that a curing agent and solvent be excluded from the resin composition. In the case where a curing agent such as peroxide-based (peroxide) or azo-based polymerization initiator is used, the curing treatment is performed at an appropriate temperature and time in consideration of the half-life thereof. The conditions in this case are optional according to the curing agent, and in general, a temperature range of about 50° C. to 200° C. is suitable.

The varnish of the present invention may include component (b), i.e. "one or a plurality of resins selected from the group consisting of a hydrocarbon-based elastomer, a polyphenylene ether-based resin, an olefin-aromatic vinyl compound-aromatic polyene copolymer, and an aromatic polyene-based resin," in a range of preferably 1 to 200 parts by mass in total, relative to 100 parts by mass of the copolymerized oligomer. Due to addition of the component (b), the effect for improving the mechanical properties of the cured product obtained from the varnish may be achieved.

Hydrocarbon-Based Elastomer

The amount of the hydrocarbon-based elastomer used in the composition of the present invention may preferably be 1 to 200 parts by mass, more preferably 1 to 100 parts by mass, and most preferably 1 to 50 parts by mass, relative to 100 parts by mass of the copolymerized oligomer. The hydrocarbon-based elastomer for suitable use in the composition of the present invention has a number average molecular weight of preferably 100 or more and 100000 or less, and more preferably 1000 or more and 4500 or less. Preferred examples of the hydrocarbon-based elastomer for suitable use in the composition of the present invention include an ethylene-based or propylene-based elastomer, a conjugated diene-based polymer, an aromatic vinyl compound-conjugated diene-based block copolymer or a random copolymer, and one or more elastomers selected from hydrides (hydrogenated products) thereof. Examples of the ethylene-based elastomer include an ethylene-octene copolymer, an ethylene-α-olefin copolymer such as ethylene-1-hexene copolymer, EPR and EPDM, and examples of the propylene-based elastomer include an atactic polypropylene, a polypropylene having low stereoregularity, and a propylene-α-olefin copolymer such as propylene-1-butene copolymer.

Examples of the conjugated diene polymer include polybutadiene and 1,2-polybutadiene. Examples of the aromatic vinyl compound-conjugated diene-based block copolymer or random copolymer, and a hydride (hydrogenated product) thereof include SBS, SIS, SEBS, SEPS, SEEPS, and SEEBS. The 1,2-polybutadiene that may be preferably used may be obtained, for example, as a liquid polybutadiene from Nippon Soda Co., Ltd., under product name of B-1000, B-2000 or B-3000. Further, examples of the copolymer containing a 1,2-polybutadiene structure that may be preferably used include "Ricon 100" manufactured by TOTAL Cray Valley. In the case where one or a plurality of resins selected from these hydrocarbon-based elastomers are in a liquid state (approximately 300000 mPa·S or less) at room temperature (25° C.), in particular, the amount thereof used is preferably 150 parts by mass or less, more preferably in the range of 1 to 30 parts by mass, most preferably 1 to 20 parts by mass relative to 100 parts by mass of the copolymerized oligomer, from the viewpoint of handleability and moldability of the composition of the present invention in an uncured state (handleability as a thermoplastic resin).

Polyphenylene Ether

As the polyphenylene ether (also referred to as "polyphenylene ether-based resin"), a commercially available known polyphenylene ether may be used. The number average molecular weight of the polyphenylene ether is optional, preferably 10000 or less, and most preferably 5000 or less, in consideration of the moldability of the composition. The number average molecular weight is preferably 500 or more.

Further, in the case of addition for the purpose of curing the composition of the present invention, it is preferable that the molecular end be modified with a functional group. Further, in the case of addition for the purpose of curing the composition of the present invention, it is preferable that a plurality of functional groups be contained in one molecule. For example, a modified polyphenylene ether is preferred. Examples of the functional group include a radically polymerizable functional group and a functional group such as epoxy group, and a radically polymerizable functional group is preferred. As the radically polymerizable functional group, a vinyl group is preferred. As the vinyl group, one or more selected from the group consisting of an allyl group, a (meth)acryloyl group, and an aromatic vinyl group are preferred, one or more selected from the group consisting of a (meth)acryloyl group and an aromatic vinyl group are more preferred, and an aromatic vinyl group is most preferred. That is, in the composition of the present invention, a bifunctional polyphenylene ether having a molecular chain modified with radically polymerizable functional groups at both ends is particularly preferred. Examples of such a polyphenylene ether include Noryl (trademark) SA9000 (a modified polyphenylene ether having a methacryloyl group at both ends, number average molecular weight: 2200) manufactured by SABIC, and a bifunctional polyphenylene ether oligomer (OPE-2St, a modified polyphenylene ether having a vinylbenzyl group at both ends, number average molecular weight: 1200) manufactured by Mitsubishi Gas Chemical Company, Inc. Alternatively, an allylated PPE manufactured by Asahi Kasei Chemicals Corporation also may be used. Among them, the bifunctional polyphenylene ether oligomer (OPE-2St) manufactured by Mitsubishi Gas Chemical Company, Inc. may be preferably used. The amount of the polyphenylene ether used in the composition of the present invention is preferably 1 to 200 parts by mass, more preferably 1 to 100 parts by mass, relative to 100 parts by mass of the copolymerized oligomer.

Olefin-Aromatic Vinyl Compound-Aromatic Polyene Copolymer

The olefin-aromatic vinyl compound-aromatic polyene copolymer in the present specification is a copolymer having a number average molecular weight of 12000 or more. The amount of the olefin-aromatic vinyl compound-aromatic polyene copolymer used in the composition of the present invention is preferably 0 to 100 parts by mass, more preferably 0 to 50 parts by mass, and most preferably 0 to 20 parts by mass, relative to 100 parts by mass of the copolymerized oligomer. With use of the olefin-aromatic vinyl compound-aromatic polyene copolymer in the range, a varnish as composition with good compatibility may be provided, and the cured product obtained from the varnish may exhibit good mechanical properties and good adhesion to members (for example, adhesion to copper foil). The use of the olefin-aromatic vinyl compound-aromatic polyene copolymer in an amount exceeding the ranges is not preferred because the viscosity of the toluene solution (varnish) is increased. The use of the olefin-aromatic vinyl compound-aromatic polyene copolymer in an amount exceeding the ranges is not preferred because the mechanical property at high temperature (storage elastic modulus at 300° C.) is decreased and the coefficient of linear thermal expansion (CTE) is increased.

Aromatic Polyene-Based Resins

The aromatic polyene-based resin includes a divinylbenzene-based reactive multi-branched copolymer (PDV) manufactured by NIPPON STEEL Chemical & Material Co., Ltd. Such PDV is described, for example, in literature "Synthesis of polyfunctional aromatic vinyl copolymers and development of novel IPN-type low dielectric loss material using the same, "M. Kawabe et al., Journal of The Japan Institute of Electronics Packaging, p. 125, Vol. 12, No. 2 (2009). The amount of the aromatic polyene-based resin used for the composition of the present invention may preferably be 1 to 200 parts by mass, more preferably 1 to 100 parts by mass, and most preferably 1 to 50 parts by mass, relative to 100 parts by mass of the copolymerized oligomer. Use of the aromatic polyene-based resin in an amount in the ranges is preferred, because the reduction in adhesion to other members and the reduction in toughness may be prevented.

Polar Monomer

The amount of polar monomers used for the resin composition of the present invention may be preferably 100 parts by mass or less relative to 100 parts by mass of the copolymerized oligomer. Incidentally, the resin composition may contain substantially no monomers. The polar monomer is a monomer having one or a plurality of atoms selected from oxygen, nitrogen, phosphorus and sulfur in the molecule, and the polar monomer suitable for use has a molecular weight of preferably less than 5000, more preferably less than 1000, and still more preferably less than 500. The polar monomers suitably used for the resin composition of the present invention are preferably polar monomers that may be polymerized with a radical polymerization initiator. Examples of the polar monomer include various maleimides, bismaleimides, maleic anhydride, triallyl isocyanurate, glycidyl (meth)acrylate, tri(meth)acrylic isocyanurate, and trimethylolpropane tri(meth)acrylate. Maleimides and bismaleimides that may be used in the present invention are described in, for example, International Publication No. WO 2016/114287 and Japanese Patent Application Laid-Open No. 2008-291227, and may be purchased from, for example, Daiwa Kasei Industry Co., Ltd., Nippon Kayaku Co., Ltd., or Designer Molecules Inc. Further, a bismaleimide-based resin "SLK" manufactured by Shin-Etsu Chemical Co., Ltd. also may be used. As these maleimide group-containing compounds, bismaleimides are preferred from the viewpoints of solubility in an organic solvent, high frequency properties, high adhesiveness to a conductor, moldability of a prepreg, etc. These maleimide group-containing compounds may be used as polyamino bismaleimide compounds from the viewpoints of solubility in an organic solvent, high frequency properties, high adhesiveness to a conductor, moldability of a prepreg, etc. The polyaminobismaleimide compound is obtained, for example, from a Michael addition reaction of a compound having two maleimide groups at a terminal and an aromatic diamine compound having two primary amino groups in a molecule. For obtaining high cross-linking efficiency with a small amount of addition, it is preferable to use a polar monomer having a polyfunctional group containing two or more functional groups, and examples thereof include bismaleimides, triallyl isocyanurate (TRIC), and trimethylolpropane tri(meth)acrylate. The amount of polar monomers for use in the resin composition of the present invention is preferably 0.1 to 20 parts by mass, more preferably 0.1 to 10 parts by mass, relative to 100 parts by mass of the copolymerized oligomer. The amount used in the range allows the resulting cured product to have a dielectric constant and a low dielectric tangent which are not excessively high. Accordingly, the dielectric constant may be suppressed to 4.0 or less, preferably 3.0 or less, and the dielectric tangent may be suppressed to 0.005 or less, preferably 0.002 or less.

Particularly preferably, the varnish of the present invention further comprises one or more selected from the group consisting of (a) curing agent, (b) one or a plurality of resins selected from the group consisting of a hydrocarbon-based elastomer, a polyphenylene ether-based resin, and an aromatic polyene-based resin, and (c) polar monomer, in addition to the copolymerized oligomer.

The varnish of the present invention may further comprise (d) solvent.

(d) Solvent

An appropriate solvent may be added to the resin composition of the present invention on an as needed basis. The amount used is not particularly limited. The solvent is used to adjust the viscosity and fluidity of the composition. In particular, in the case where the resin composition of the present invention is in a varnish form, a solvent is preferably used. A solvent having a boiling point at a certain level or more is preferred, because the solvent having a too low boiling point under atmospheric pressure, that is, too high volatility, may allow a non-uniform thickness of the applied film to be produced. The preferred boiling point is approximately 100° C. or more, more preferably 130° C. or more and 300° C. or less, under atmospheric pressure. Examples of the solvent for use include cyclohexane, toluene, ethylbenzene, xylene, mesitylene, tetralin, acetone, limonene, a mixed alkane, and a mixed aromatic-based solvent. The amount used for the composition of the present invention is optional, preferably 5 to 500 parts by mass, more preferably 10 to 300 parts by mass, and most preferably 50 to 150 parts by mass relative to 100 parts by mass of the copolymerized oligomer.

From a different viewpoint, the present invention may provide a cured product comprising an olefin-aromatic vinyl compound-aromatic polyene copolymerized oligomer satisfying all of the following conditions (1) to (4). Preferably, the cured product may be a cured product of the composition comprising an olefin-aromatic vinyl compound-aromatic polyene copolymerized oligomer satisfying all of the following conditions (1) to (4).

(1) The number average molecular weight of the copolymerized oligomer is 500 or more and less than 12000, preferably 500 or more and less than 10000, particularly preferably 500 or more and less than 5000.

(2) The aromatic vinyl compound monomer is an aromatic vinyl compound having 8 or more and 20 or less carbon atoms, and the content of the unit of the aromatic vinyl compound monomer is 0 mass % or more and 90 mass % or less, preferably 10 mass % or more and less than 70 mass %.

(3) The aromatic polyene is one or more selected from the group consisting of polyenes having 5 or more and 20 or less carbon atoms and having a plurality of vinyl groups and/or vinylene groups in the molecule, and the content of the vinyl groups and/or the vinylene groups derived from a unit of the aromatic polyene is 1.5 pieces or more and less than 10 pieces per number average molecular weight.

(4) The olefin is one or more selected from olefins having 2 or more and 20 or less carbon atoms, and the total of units of the olefin monomer, the aromatic vinyl compound monomer, and the aromatic polyene monomer is 100 mass %.

The cured product further comprises one or more selected from the group consisting of the following (a) to (c).

(a) Curing agent.

(b) One or a plurality of resins selected from the group consisting of a hydrocarbon-based elastomer, a polyphenylene ether-based resin, an olefin-aromatic vinyl compound-aromatic polyene copolymer, and an aromatic polyene-based resin.

(c) Polar monomer.

The (a) to (c) have the same meaning as in the above description. Although it is preferable that the (d) solvent is removed through volatilization from the cured product, a part thereof may allow to remain as long as no practical problem occurs.

Particularly preferably, the cured product of the present invention may be obtained by curing a composition comprising (a) curing agent, (b) one or a plurality of resins selected from the group consisting of a hydrocarbon-based elastomer, a polyphenylene ether-based resin, and an aromatic polyene-based resin, and (c) polar monomer, in addition to the copolymerized oligomer.

The varnish or the cured product of the present invention may further comprise one or more selected from the group consisting of (e) filler, (f) flame retardant, and (g) surface modifier.

Fillers

Further, a known inorganic or organic filler may be added on an as needed basis. These fillers are added for the purpose of controlling the coefficient of thermal expansion, controlling the thermal conductivity, and reducing the cost, and the amount used thereof is optional depending on the purpose. In particular, in the case of adding an inorganic filler, it is preferable to use a known surface modifier, for example, a silane coupling agent. In particular, for the purpose of producing a resin composition excellent in low dielectric constant and low dielectric loss, which is one of the objects of the present invention, one or more selected from the group consisting of boron nitride (BN) and silica are preferred as the inorganic filler, and silica is preferred. Among silicas, fused silica is preferred. From the viewpoint of low dielectric properties, since the dielectric constant increases high with a large amount of addition or compounding, in particular, the filler in amount of preferably less than 500 parts by mass, more preferably less than 400 parts by mass, relative to 100 parts by mass of the copolymerized oligomer is used. In order to improve the low dielectric properties (low dielectric constant and low dielectric loss tangent), a hollow filler or a filler having a shape with many voids may be added.

Alternatively, an organic filler such as high molecular weight polyethylene or ultra-high molecular weight polyethylene may be used instead of inorganic fillers. It is preferable that the organic filler be crosslinked by itself from the viewpoint of heat resistance, and it is preferable that the organic filler be compounded in a form of fine particles or powder. These organic fillers may suppress the increase in dielectric constant and dielectric tangent.

Meanwhile, in the resin composition of the present invention, a high dielectric constant insulating filler having a dielectric constant at 1 GHz of preferably 4 to 10000, more preferably 5 to 10000, may be mixed and dispersed to prepare an insulating cured product having a high dielectric constant insulating layer having a dielectric constant of preferably 4 to 20, with suppressed increase in dielectric tangent (dielectric loss). With increase in the dielectric constant of the film made of insulating cured product, downsizing of a circuit and increase in capacity of a capacitor may be achieved, which contribute to downsizing of electric components for high frequencies. The high dielectric constant and low dielectric tangent insulating layer is suitable for applications such as capacitors, inductors for resonant circuits, filters, and antennas. Examples of the high dielectric constant insulating filler used in the present invention include inorganic fillers and insulated metal particles. Specific examples include known high dielectric constant inorganic fillers such as barium titanate and strontium titanate, and other examples are specifically described in, for example, Japanese Patent Application Laid-Open No. 2004-087639.

Flame Retardants

A known flame retardant may be used in the resin composition of the present invention. Preferred flame retardants are known organic phosphorus-based flame retardants such as phosphoric acid esters or condensates thereof, known bromine-based flame retardants, and red phosphorus, from the viewpoint of maintaining low dielectric constant and low dielectric tangent. In particular, among phosphoric acid esters, a compound having a plurality of xylenyl groups in the molecule is preferred from the viewpoint of flame retardancy and low dielectric tangent property.

In addition to the flame retardants, flame retardant aids including antimony compounds such as antimony trioxide, antimony tetroxide, antimony pentoxide and sodium antimonate, or nitrogen-containing compounds such as melamine, triallyl-1,3,5-triazine-2,3,4-(1H, 3H, 5H)-trione, and 2,4,6-triallyloxy-1,3,5-triazine may be added. In general, the total amount of these flame retardants and flame retardant aids is preferably 1 to 100 parts by mass relative to 100 parts by mass of the resin composition. Alternatively, 30 to 200 parts by mass of the polyphenylene ether (PPE)-based resin having a low dielectric constant and excellent flame retardancy may be compounded relative to 100 parts by mass of the flame retardant.

Surface Modifiers

The resin composition of the present invention may contain various surface modifiers for the purpose of improving adhesion to fillers, copper plates, and wiring. The amount of the surface modifier used may preferably be 0.01 to 10 parts by mass, more preferably 0.1 to 5 parts by mass, relative to 100 parts by mass of the resin composition of the present invention other than the surface modifier. Examples of the surface modifier include various silane coupling agents and titanate-based coupling agents. One or a plurality of various silane coupling agents and titanate-based coupling agents may be used.

The composition and varnish of the present invention may contain additives usually used for resins such as antioxidants, weathering agents, light stabilizers, lubricants, compatibilizers, and antistatic materials, as long as the effect and purpose of the present invention are not impaired. The composition and varnish of the present invention are obtained by mixing, dissolving or melting the various additives described above. Any known method may be adopted as the method of mixing, dissolving and melting.

Varnish

The varnish of the present invention may be prepared to exhibit a viscous liquid state at room temperature or a heated temperature of 100° C. or less by adjusting the composition and molecular weight of the copolymerized oligomer used, adding a certain amount or more of a liquid monomer or solvent within the range of the present invention, or adding a flame retardant in a liquid state. Thereby, the varnish has a viscosity of some hundreds of thousands mPa·s or less, preferably 2000 mPa·s or less, more preferably 1000 mPa·s or less, and most preferably 500 mPa·s or less. Specifically, application, impregnation, filling, or dropping to another material is performed by an appropriate method and curing by heat or light is performed to obtain a desired cured product. Such properties allow an insulating film or insulating layer to be formed by curing after various transfer moldings (press-fitting), application on or between substrates and semiconductor device materials, extrusion lamination, or spin coating.

In the case where the composition of the present invention is used as the varnish, regardless of the above description, the monomer in amount of 10 parts by mass or more and 1000 parts by mass or less, preferably 200 parts by mass or less, relative to 100 parts by mass of the copolymerized oligomer of the present invention, and a solvent in an amount of 10 parts by mass or more and 2000 parts by mass or less, relative to 100 parts by mass of the copolymerized oligomer may be used. The preferred solvent for the varnish is as described above. After application or impregnation of the varnish, the solvent (medium) or the like may be removed by heating, air drying or the like, and then curing may be performed. Alternatively, the varnish may be cured in parallel with removal of the solvent.

Molded Product

From the composition of the present invention, any shape of a molded product may be obtained. For example, in the case where the composition is a varnish containing a solvent, through removal of the solvent by heating, depressurizing, air drying or the like after application on a substrate, a sheet or film-shaped molded product is generally obtained. Further, depending on the formulation of the composition, the composition itself may be a thermoplastic composition. In that case, molding into a sheet shape is achieved by a known resin processing method such as extrusion method. Uncured sheets and films may be obtained by these methods. Alternatively, a porous base material, woven fabric, or nonwoven fabric may be impregnated with the composition of the present invention and the solvent may be removed in the same manner to obtain a composite. Further, the composition may be dropped on a base material and the solvent may be removed to obtain, for example, a hemispherical shape. Further, in the case where no solvent is contained, the composition may be heated and melted under temperature conditions in which the curing agent is inactive, and then molded and cooled to obtain the similar molded product. The sheet may be uncured (semi-cured) to an extent that the sheet shape can be maintained, or may be completely cured. The degree of curing of the composition may be quantitatively measured by a known dynamic mechanical analysis (DMA).

Curing

The composition including the varnish of the present invention may be cured by a known method by reference to curing conditions (temperature, time and pressure) of the curing agent contained. In the case where the curing agent used is a peroxide, the curing conditions may be determined by reference to the half-life temperature and the like disclosed for each peroxide.

Cured Products Obtained from Compositions

In a measurement range of 10 to 30 GHz or 25 to 40 GHz, particularly preferably at 10 GHz, the dielectric constant of the cured product obtained from the composition including the varnish of the present invention is preferably 4.0 or less and 2.0 or more, more preferably 3.0 or less and 2.0 or more, and most preferably 2.5 or less and 2.0 or more. The dielectric tangent is preferably less than 0.005 and 0.0003 or more, more preferably 0.003 or less and 0.0005 or more. The volume resistivity of the resulting cured product is preferably $1\times10^{15}\,\Omega\cdot cm$ or more. These values are preferred values, for example, as an electrically insulating material for high frequencies of 3 GHz or more. Since the copolymerized oligomer used in the composition of the present invention is relatively soft and has high tensile elongation, the cured product obtained from the composition using the copolymer is relatively soft and has high impact resistance and followability to the thermal expansion of a base material while exhibiting sufficient mechanical properties. That is, the cured product of the present invention has a tensile elastic modulus of preferably less than 3 GPa and 5 MPa or more, more preferably 10 MPa or more, measured at room temperature (23° C.), and more preferably 50 MPa or more for use as a substrate such as CCL. The tensile strength at break is preferably less than 50 MPa and 5 MPa or more, more preferably 15 MPa or more, and the tensile elongation at break is preferably 10% or more, more preferably 30% or more. The tensile elongation at break is preferably less than 300%. The cured product of the composition of the present invention may have practically sufficient heat resistance.

General Use of the Resin Composition or Composition of the Present Invention

The resin composition or composition of the present invention may be used as coverlays, solder resists, build-up materials, interlayer insulators, and interlayer adhesives. Further, the composition may be used as a printed circuit board, a flexible printed circuit board, a CCL (copper clad laminate) circuit board, or a FCCL (flexible copper clad laminate) circuit board. Further, the composition may be used as a build-up film, a bonding sheet, a coverlay sheet, a bump sheet for flip chip bonders, or an electrically insulating layer for substrates.

Use of Compositions as Uncured Sheet or Partially Cured Sheet

An uncured sheet or partially cured sheet of the composition of the present invention may be suitably used as an electrically insulating material for high frequencies. For example, the sheet may be suitably used as a build-up film, a bonding sheet, a coverlay sheet, a bump sheet for flip chip bonders, or an insulating layer for substrates. A film or sheet of the composition used as a substitute for the conventionally used epoxy resin or silicone resin may be cured to form a cured matrix phase having a low dielectric constant and low dielectric loss. The thickness of the sheet is generally 1 to 300 microns. The sheet may contain a woven fabric or non-woven fabric of glass cloth or ceramic fiber, may be used for impregnation, or may be multilayered with the fabric. Further, as an antenna cable for mobile phones or the like, a flexible and bendable wiring partially or wholly insulated with the sheet may be used instead of the conventional coaxial cable. For example, wiring may be insulation-coated with an LCP (liquid crystal polymer) or a PPE sheet, and the sheet of the present invention or B stage sheet (coverlay sheet) for use.

The multilayer wiring board having an insulating layer of the cured product obtained by using the composition of the present invention may be a wiring board having a small dielectric loss and excellent high frequency properties. In this case, the merits include heat resistance that can withstand soldering, and a certain degree of softness, elongation, and impact resistance that may withstand stress due to heat cycle or thermal expansion difference, in addition to low dielectric loss. For example, a core material such as a cloth made of glass or quartz, a non-woven fabric, a film material, a ceramic substrate, a glass substrate, a general-purpose resin plate of epoxy, and a general-purpose laminated plate, and a conductor foil with an insulating layer made of the cured product are laminated and pressed for the preparation. Alternatively, a slurry or solution containing a curable resin composition may be applied to a core material, dried and cured to form an insulating layer. The thickness of the insulating layer is generally 1 to 300 microns. Such a multi-layer wiring board may be multilayered or integrated for use.

The cured product obtained by curing the curable resin or curable resin composition of the present invention may be suitably used as an electrically insulating material as described above. In particular, the cured product may be used as an electrically insulating material, particularly as an electrically insulating material for high frequencies, including as a potting material, a surface coating agent, a coverlay, a solder resist, a build-up material, an underfill material, a filling insulator, an interlayer insulator, and an interlayer adhesive, or as a cured product for a printed circuit board, a flexible printed circuit board, a CCL (copper clad laminate) base material, a FCCL (flexible copper clad laminate) base material, or as a cured product for a build-up film, a bonding sheet, a coverlay sheet, or a bump sheet for flip tip bonders.

In another embodiment of the present invention, an electrically insulating material containing the olefin-aromatic vinyl compound-aromatic polyene copolymerized oligomer, and having a storage elastic modulus at 300° C. of $5\times10^5$ Pa or more, and a dielectric constant of 2.5 or less and 2.0 or more and a dielectric tangent of 0.003 or less and 0.0005 or more at 23° C. in a measurement range of 10 to 30 GHz, may be provided.

The uncured or semi-cured thermoplastic resin composition of the present invention may be adhered to a copper foil for wiring by heating under pressure without application of an adhesive or without adhesive treatment. Here, the copper foil conceptually includes copper wiring. In particular, a peel strength of 1.0 N/mm or more in the measurement according to the Japanese Industrial Standards (JIS) C6481: 1996 may be imparted in the case where the olefin-aromatic vinyl compound-aromatic polyene copolymerized oligomer that is a raw material preferably has an aromatic vinyl compound content of 10 mass % or more, and/or the olefin is ethylene alone or the α-olefin content relative to ethylene contained is 6 mass % or less, preferably 4 mass % or less. In general, it is known that the dielectric properties of a laminate such as copper-clad laminate are degraded by an adhesive or adhesive treatment. It is therefore preferable that a peel strength of 1.0 N/mm or more be imparted in the measurement in accordance with Japanese Industrial Standards (JIS) C6481: 1996 without such a treatment. As described above, the uncured or semi-cured thermoplastic resin composition of the present invention may be adhered to the copper foil for wiring by a curing treatment such as heating under pressure, without application of an adhesive or an adhesive treatment. However, in the present invention, with respect to imparting adhesiveness to copper foil and other members, other adhesiveness-imparting measures (application of an adhesive, adhesive treatment, etc.) including addition of the "surface modifier" may be implemented without any preclusion.

Method for Producing Copolymerized Oligomer

The copolymerized oligomer may be produced by copolymerizing monomers of an olefin, an aromatic vinyl compound, and an aromatic polyene by any method. Further, the polymerization solution obtained in the following production method may be used as it is as a varnish or a raw material thereof.

Use of a single-site-coordinated polymerization catalyst composed of a transition metal compound represented by the following general formula (1) and a co-catalyst is preferred, because an olefin-aromatic vinyl compound-aromatic polyene copolymerized oligomer satisfying the number average molecular weight of the present invention may be produced at a lower polymerization temperature, that is, under a lower polymerization pressure, without using a chain transfer agent such as hydrogen.

Formula (1)

Chemical Formula 1

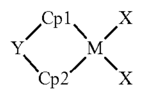

(1)

In the formula, M is zirconium or hafnium.

Cp1 and Cp2 are cyclopentadienyl groups having no substituent, or cyclopentadienyl groups having one or two alkyl substituents (preferably having 1 to 3 carbon atoms) having no cyclic structure. One of the Cp1 and Cp2 groups may be an indenyl group having no substituent, or an indenyl group having one or two alkyl substituents (preferably having 1 to 3 carbon atoms) having no cyclic structure. The groups Cp1 and Cp2 may be the same or different from each other. In order to produce a lower molecular weight olefin-aromatic vinyl compound-aromatic polyene copolymerized oligomer, preferably both Cp1 and Cp2 are cyclopentadienyl groups having no substituent or cyclopentadienyl groups having one or two alkyl substituents (preferably having 1 to 3 carbon atoms) having no cyclic structure.

Y is carbon, silicon, germanium or boron having a bond with Cp1 and Cp2 and having a hydrogen atom or a substituent. The substituents may be different from each other or the same, and may have a cyclic structure such as a cyclohexyl group. The substituent preferably refers to a substituent such as an alkyl group or a phenyl group.

X may be the same or different from each other, and is preferably selected from the group consisting of hydrogen, halogens such as chlorine and bromine, alkyl groups such as a methyl group and an ethyl group, and aryl groups such as a phenyl group. The aryl group may include an alkylaryl group such as benzyl group.

Further, two X may be bonded to each other to form a diene group such as butadiene group and isoprene group.

Examples of the transition metal compounds include dimethylmethylene biscyclopentadienyl zirconium dichloride, diphenylmethylene biscyclopentadienyl zirconium dichloride, dimethylmethylene(cyclopentadienyl) (1-indenyl) zirconium dichloride, and diphenylmethylene(cyclopentadienyl) (1-indenyl) zirconium dichloride.

In parallel with the single-site-coordinated polymerization catalyst of the present invention, a known co-catalyst conventionally used in combination with a transition metal compound may be used as the co-catalyst. As the co-catalyst, an alumoxane such as methylaluminoxane (or referred to as methylalmoxane or MAO) or a boron compound is preferably used. On an as needed basis, an alkylaluminum such as triisobutylaluminum and triethylaluminum may be used together with the alumoxane and boron compounds. Examples of the co-catalysts include the co-catalysts and alkylaluminum compounds described in European Patent Application Publication No. 0872492A2, Japanese Patent Laid-Open No. 11-130808, Japanese Patent Laid-Open No. 9-309925, International Publication No. 00/20426, European Patent Application Publication No. 0985689A2, and Japanese Paten Laid-Open No. 6-184179.

The co-catalyst such as alumoxane and the metal of the transition metal compound may preferably have an aluminum atom/transition metal atom ratio of 0.1 to 100000, more preferably 10 to 10000. With a ratio of 0.1 or more, the transition metal compound may be effectively activated, and with a ratio of 100000 or less, economical advantage is obtained. In the case where a boron compound is used as the co-catalyst, the boron atom/transition metal atom ratio may preferably be 0.01 to 100, more preferably 0.1 to 10, and most preferably 1. With a ratio of 0.01 or more, the transition metal compound may be effectively activated, and with a ratio of 100 or less, economical advantage is obtained. The transition metal compound and the co-catalyst may be mixed and prepared outside the polymerization facility, or may be mixed inside the facility during polymerization.

Production of Copolymerized Oligomer

The copolymerized oligomer of the present invention is produced by bringing raw material monomers each including an olefin, an aromatic vinyl compound, and an aromatic polyene into contact with a single-site-coordinated polymerization catalyst composed of the transition metal compound and a co-catalyst. The sequence and method used for the production may be any known method. For example, the copolymerized oligomer may be produced by correspondingly applying the method for producing a copolymer described in International Publication No. 00/37517, Japanese Patent Laid-Open No. 2009-161743, or Japanese Patent Laid-Open No. 2010-280771.

In the case of using the single-site-coordinated polymerization catalyst composed of the transition metal compound and the co-catalyst, for example, the low molecular weight copolymerized oligomer of the present invention may be produced without using a chain transfer agent. However, for example, use of a chain transfer agent for production of a copolymerized oligomers having lower molecular weight causes no problem. As the chain transfer agent, a known chain transfer agent used in combination with a so-called single-site-coordinated polymerization catalyst may be used, and examples thereof include hydrogen and alkylaluminums such as triisobutylaluminum, and 9-BBN described in Chung T. C.: Macromolecules, 26, 3467 (1993).

Examples of the production method include a method of polymerizing in a liquid monomer without using a solvent, and a method of using a saturated aliphatic, an aromatic hydrocarbon, or a halogenated hydrocarbon such as pentane, hexane, heptane, cyclohexane, methylcyclohexane, benzene, toluene, ethylbenzene, xylene, mesitylene, limonene, chloro-substituted benzene, chloro-substituted toluene, methylene chloride, and chloroform as a single or mixed solvent. Preferably, a mixed alkane solvent, cyclohexane, toluene, ethylbenzene or the like is used. The polymerization may be any one of solution polymerization and slurry polymerization. Further, on an as needed basis, known methods such as batch polymerization, continuous polymerization, prepolymerization, and multistage polymerization may be used.

A single or plurality of connected tank type polymerization cans, and a single linear or loop pipe polymerization facility or a plurality of connected pipe polymerization facilities may be used. The pipe-shaped polymerization can may include various known mixers such as dynamic or static mixers and static mixers that also remove heat, and various known coolers such as coolers equipped with thin tubes for heat removal. Further, a batch type prepolymerization can may be included. Further, a method such as gas phase polymerization may be used.

The polymerization temperature may preferably be 0° C. to 200° C. With a temperature of 0° C. or more, the polymerization rate is high, which is industrially advantageous. With a temperature of 200° C. or less, no decomposition of the transition metal is caused. Further, the temperature is industrially preferably 30° C. to 160° C., and particularly preferably 50° C. to 160° C. The pressure during polymerization is generally preferably 1 atm to 100 atm, more preferably 1 atm to 30 atm, and industrially most preferably 1 atm to 10 atm.

The oligomer is collected from the polymerization solution obtained after completion of the polymerization by a known method. Industrially preferably, a steam stripping method or a crumb forming method, which is a so-called recovery method of raw rubber, may be used. In a laboratory, a method of precipitating an oligomer in a large amount of methanol, which is a so-called methanol precipitation method, is generally convenient. Alternatively, the whole or a part of the solvent or residual monomer may be removed from the polymerization solution by an evaporation method using a rotary evaporator, a film evaporator or the like without collection of the oligomer, and the oligomer may be diluted with a solvent for use as a varnish.

From another point of view, the present invention may provide a cured product comprising an olefin-aromatic vinyl compound-aromatic polyene copolymerized oligomer obtained by using a single-site-coordinated polymerization catalyst composed of the transition metal compound represented by the general formula (1) and a co-catalyst. It is preferable that the olefin-aromatic vinyl compound-aromatic polyene copolymerized oligomer contained in the cured product satisfy the conditions (1) to (4) described above.

Further, it is preferable that the cured product further contains one or more selected from the following (a) to (c):

(a) curing agent;

(b) one or a plurality of resins selected from the group consisting of a hydrocarbon-based elastomer, a polyphenylene ether-based resin, an olefin-aromatic vinyl compound-aromatic polyene copolymer, and an aromatic polyene-based resin; and (c) polar monomer.

Among the resins (b), one or a plurality of resins selected from the group consisting of a hydrocarbon-based elastomer, a polyphenylene ether-based resin and an aromatic polyene-based resin are preferred.

EXAMPLES

Hereinafter, the present invention will be described with reference to Examples, though the present invention is not limited to the following Examples.

The copolymers obtained in synthetic examples and comparative synthetic examples were analyzed by the following means.

The content of vinyl group units derived from ethylene, hexene, styrene, and divinylbenzene in a copolymer was determined by $^1$H-NMR based on the peak area intensity assigned to each. The sample was dissolved in heavy 1,1,2,2-tetrachloroethane, and the measurement was performed at 80 to 130° C.

As molecular weight, the number average molecular weight (Mn) in terms of standard polystyrene was determined by GPC (gel permeation chromatography). The measurement was performed under the following conditions.

In the case where the number average molecular weight is 1000 or more:

Column: Two TSK-GEL Multipore HXL-M having a diameter of 7.8 mm and a length of 300 mm (manufactured by Tosoh Corporation) were connected in series for use.

Column temperature: 40° C.

Solvent: THF

Liquid flow rate: 1.0 ml/min.

Detector: RI detector

In the case of a number average molecular weight of less than 1000:

Column: One TSKgel G3000HXL having a diameter of 7.8 mm and a length of 300 mm, one TSKgel G2000HXL having a diameter of 7.8 mm and a length of 300 mm, and four TSKgel G1000HXL having a diameter of 7.8 mm and a length of 300 mm, (manufactured by Tosoh Corporation) were connected in series for use.

Column temperature: 40° C.

Solvent: THF

Liquid flow rate: 0.5 ml/min.

Detector: RI detector

Determination of Degree of Cross-Linking

A cured product in a sheet shape was placed in xylene, heated to the boiling point, and collected after refluxing for 1 hour. A sample with no dissolution observed was determined to be "cross-linked" (expressed as circle). A sample with dissolution or partial dissolution observed was determined to be "insufficiently cross-linked" (expressed as X-mark).

Measurement of Storage Elastic Modulus

Using a dynamic viscoelasticity measuring apparatus (RSA-GII manufactured by TA Instruments, or former Rheometric Scientific), measurement was performed at a frequency of 1 Hz, at 300° C. while raising temperature from room temperature. A measurement sample (3 mm×40 mm) cut out from a film having a uniform thickness allowable for the measurement in the range from about 0.1 mm to 0.3 mm was subjected to precise measurement of the thickness and measurement for determining the storage elastic modulus. The main measurement parameters related to the measurement are as follows.

Measurement frequency: 1 Hz

Rate of temperature rise: 3° C./min

Measurement length of sample: 10 mm

Distortion: 0.1%

Coefficient of Water Absorption

Measurement was performed in accordance with ASTM D570-98.

Dielectric Constant and Dielectric Loss (Dielectric Tangent)

A sample with sizes of 1 mm×1.5 mm×80 mm cut out from a sheet was used for the measurement of the dielectric constant and dielectric tangent by a cavity resonator perturbation method (8722ES type network analyzer manufactured by Agilent Technologies Japan, Ltd., and cavity resonator manufactured by KANTO Electronic Application and Development Inc.), at 23° C. and 10 GHz.

In addition, a balanced disk resonator (manufactured by Keysight Technologies, Inc.) was used to evaluate the dielectric properties in the same manner. In the dielectric property evaluation method with the balanced disc resonator, two identical samples (diameter: 3 cm, thickness: 0.3 mm) were prepared to sandwich a copper foil between them. The whole was set in the resonator, and the resonance frequency (f0) of the peak appearing at 25 to 40 GHz and the no-load Q value (Qu) were measured. The dielectric constant was calculated from f0, and the dielectric tangent (tan 6c) was calculated from Qu using the attached analysis software (Balanced type circular disk resonator (method) calculator). The measured temperature was 23° C. and the humidity was 50% RH.

Volume Resistivity

A film having a thickness of about 0.5 mm was used for the measurement at room temperature in accordance with JIS K6911: 2006.

Tensile Test

In accordance with JIS K-6251: 2017, a film sheet with a thickness of about 1 mm was cut into the shape of No. 2 dumbbell No. 1/2 type test piece. By using Tensilon UCT-1T manufactured by ORIENTEC CORPORATION, measurement was performed at 23° C. and a tensile speed of 500 ram/min to determine the tensile elastic modulus, the tensile strength at break, and the tensile elongation at break.

Catalyst (Transition Metal Compound)

In the following Examples, as the catalyst (transition metal compound), dimethylmethylene biscyclopentadienyl zirconium dichloride having a structure satisfying the general formula (1) (isopropylidene biscyclopentadienyl zirconium dichloride, of which structure is shown in the following formula (2)) was used.

Formula (2)

Chemical Formula 2

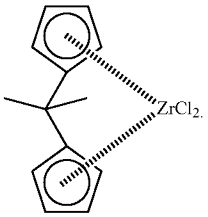

Production of Copolymerized Oligomer

Synthesis Examples O-1, O-2 and O-3: Synthesis of Ethylene-Hexene-Styrene-Divinylbenzene Copolymerized Oligomer and Ethylene-Styrene-Divinylbenzene Copolymerized Oligomer With reference to the production methods described in Japanese Patent Laid-Open No. 9-40709, Japanese Patent Laid-Open No. 9-309925, Japanese Patent Laid-Open No. 2009-161743, and Japanese Patent Laid-Open No. 2010-280771, using dimethylmethylene biscyclopentadienyl zirconium dichloride as catalyst, modified methylaluminoxane (toluene solution of MMAO-3A, manufactured by Tosoh Finechem Corporation) as co-catalyst, cyclohexane as solvent, styrene, divinylbenzene, and ethylene as raw materials, and 1-hexene on an as needed basis, polymerization was performed in an autoclave having a capacity of 10 L, equipped with a stirrer and a heating and cooling jacket. Into the resulting polymerization solution, 1-isopropanol was added, and then a large amount of methanol was added thereto to collect a copolymerized oligomer. The copolymerized oligomer was thinly spread in a large container and vacuum dried at 30° C. for 2 days and nights. The raw material composition and the polymerization temperature were changed to obtain the copolymerized oligomers 0-1 and 0-2 shown in Table 1. As for 0-2 and 0-3, they were synthesized without using 1-hexene. The total of units of the olefin monomer, the aromatic vinyl compound monomer, and the aromatic polyene monomer was defined as 100 mass %. The composition and number average molecular weight of the copolymerized oligomers are shown in Table 1.

Synthesis Example O-4

With reference to the production methods described in Japanese Patent Laid-Open No. 9-309925, Japanese Patent Laid-Open No. 2009-161743, and Japanese Patent Laid-Open No. 2010-280771, using rac-diphenylmethylene(cyclopentadienyl) (1-indenyl) zirconium dichloride as catalyst, modified methylaluminoxane (toluene solution of MMAO-3A, manufactured by Tosoh Finechem Corporation) as co-catalyst, cyclohexane as solvent, and styrene, divinylbenzene, and ethylene as raw materials, polymerization was performed in an autoclave having a capacity of 10 L, equipped with a stirrer and a heating and cooling jacket. Into the resulting polymerization solution, 1-isopropanol was added, and then a large amount of methanol was added thereto to collect a copolymerized oligomer. The copolymerized oligomer was vacuum dried at 30° C. for 2 days and nights in the same manner as described above.

Chemical Formula 3

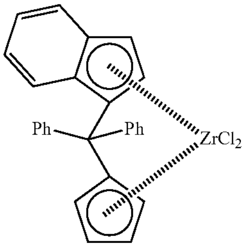

Synthesis Example P-1

With reference to the production methods described in Japanese Patent Laid-Open No. 2009-161743 and Japanese Patent Laid-Open No. 2010-280771, using rac-dimethylmethylene bis(4,5-benzo-1-indenyl) zirconium dichloride, of which structure does not satisfy the general formula (1), (having a structure shown in the following formula (3)) as catalyst, modified methylaluminoxane (toluene solution of MMAO-3A, manufactured by Tosoh Finechem Corporation) as co-catalyst, cyclohexane as solvent, and styrene, divinylbenzene, and ethylene as raw materials, synthesis was performed in the same manner as for the oligomers in Synthesis Examples 0-1 to 4 so as to obtain a copolymer P-1. The composition and number average molecular weight of the copolymer are shown in Table 1. Since rac-dimethylmethylene bis(4,5-benzo-1-indenyl) zirconium dichloride has no cyclopentadienyl group, the general formula (1) is not satisfied.

Formula (3)

Chemical Formula 4

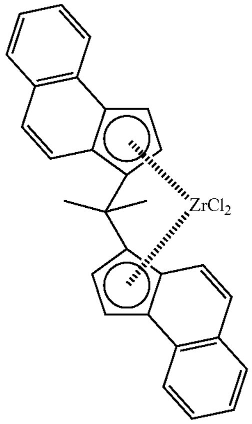

Synthesis Example P-2

With reference to the production methods described in Japanese Patent Laid-Open No. 9-309925, Japanese Patent Laid-Open No. 2009-161743, and Japanese Patent Laid-Open No. 2010-280771, using rac-dimethylmethylene bis (1-indenyl) zirconium dichloride (having a structure shown in the following formula (4)) as catalyst, modified methylaluminoxane (toluene solution of MMAO-3A, manufactured by Tosoh Finechem Corporation) as co-catalyst, cyclohexane as solvent, and styrene, divinylbenzene, and ethylene as raw materials, polymerization was performed in an autoclave having a capacity of 10 L, equipped with a stirrer and a heating and cooling jacket. Into the resulting polymerization solution, 1-isopropanol was added, and then a large amount of methanol was added thereto to collect a copolymerized oligomer. The copolymerized oligomer was vacuum dried at 30° C. for 2 days and nights in the same manner as described above. Since rac-dimethylmethylene bis(1-indenyl) zirconium dichloride has no cyclopentadienyl group, the general formula (1) is not satisfied.

Formula (4)

Chemical Formula 5

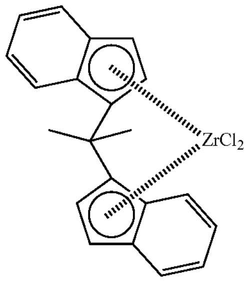

The raw materials were as follows.

As 1,2-PBd, B3000 (number average molecular weight: 3200) manufactured by Nippon Soda Co., Ltd. was used. A bifunctional polyphenylene ether oligomer (OPE-2St, number average molecular weight: 1200) was used. A toluene solution product manufactured by Mitsubishi Gas Chemical Company was further diluted with toluene, and a large amount of methanol was added thereto to cause methanol precipitation. After air drying, drying under reduced pressure was performed to obtain a polyphenylene ether oligomer in a powder state for use. As SEBS, H-1041 manufactured by Asahi Kasei Chemicals Corporation was used. As curing agent, Percumyl D (dicumyl peroxide) manufactured by NOF CORPORATION was used.

TABLE 1

| Copolymerized oligomer or polymer | Ethylene content mass % | 1-Hexene content mass % | Styrene content mass % | Divinylbenzene vinyl group (Pieces/Number average molecular weight) | Number average molecular weight Mn |
|---|---|---|---|---|---|
| O-1 | 62 | 3 | 20 | 2.5 | 2100 |
| O-2 | 56 | 0 | 34 | 2.2 | 3000 |
| O-3 | 50 | 0 | 42 | 3.8 | 6400 |
| O-4 | 43 | 0 | 53 | 3.1 | 10400 |
| P-1 | 51 | 0 | 48 | 2.7 | 36000 |
| P-2 | 53 | 0 | 45 | 3.3 | 18000 |

TABLE 2

| | Example 1 | Example 2 | Example 3 | Example 4 | Example 5 | Example 6 | Example 7 | Example 8 | Example 9 |
|---|---|---|---|---|---|---|---|---|---|
| O-1 | 100 | — | 100 | — | — | — | — | — | — |
| O-2 | — | 100 | — | 100 | — | — | — | — | — |
| O-3 | — | — | — | — | 100 | 100 | — | — | 100 |
| O-4 | — | — | — | — | — | — | 100 | 100 | — |
| P-1 | — | — | — | — | — | — | — | — | — |
| P-2 | — | — | — | — | — | — | — | — | 50 |
| Hydrocarbon-based elastomer 1,2-PBd B3000 | — | — | 100 | — | — | — | — | — | — |
| Bifunctional polyphenylene ether oligomer (OPE-2St) | — | — | — | 100 | — | 50 | — | 50 | — |
| SEBS H-1041 | — | — | 30 | — | — | — | — | — | — |
| Solvent (toluene) | 100 | 100 | 200 | 200 | 100 | 200 | 200 | 200 | 250 |
| Curing agent dicumyl peroxide | 1 part by mass* | 1 part by mass* | 1 part by mass | 1 part by mass* | 1 part by mass* | 1 part by mass* | 1 part by mass* | 1 part by mass* | 1 part by mass* |
| State of cured product | Semi-hard resin state | Semi-hard resin state | Soft resin state | Semi-hard resin state | Soft resin state | Semi-hard resin state | Soft resin state | Semi-hard resin state | Semi-hard resin state |
| Degree of crosslinking | ○ | ○ | ○ | ○ | ○ | ○ | ○ | ○ | ○ |
| Storage elastic modulus (300° C.)/Pa | $3.7 \times 10^6$ | $4.3 \times 10^6$ | $3.0 \times 10^6$ | $3.9 \times 10^6$ | $3.5 \times 10^6$ | $2.9 \times 10^6$ | $2.5 \times 10^6$ | $2.9 \times 10^6$ | $3.0 \times 10^6$ |
| Volume resistivity/ Ω · cm | $>10^{15}$ | $>10^{15}$ | $>10^{15}$ | $>10^{15}$ | $>10^{15}$ | $>10^{15}$ | $>10^{15}$ | $>10^{15}$ | $>10^{15}$ |
| Dielectric constant (10 GHz) | 2.3 | 2.1 | 2.8 | 2.5 | 2.2 | 2.3 | 2.3 | 2.4 | 2.2 |
| Dielectric loss tangent (10 GHz) | 0.0015 | 0.0011 | 0.0023 | 0.0016 | 0.0009 | 0.0018 | 0.0010 | 0.0016 | 0.0010 |
| Dielectric constant (25 to 40 GHz) | 2.37 | 2.23 | 2.84 | 2.60 | Unmeasured | Unmeasured | Unmeasured | Unmeasured | Unmeasured |
| Dielectric loss tangent (25 to 40 GHz) | 0.0014 | 0.0013 | 0.0025 | 0.0012 | Unmeasured | Unmeasured | Unmeasured | Unmeasured | Unmeasured |
| Coefficient of water absorption/mass % | <0.1 | <0.1 | <0.1 | <0.1 | <0.1 | <0.1 | <0.1 | <0.1 | <0.1 |

TABLE 2-continued

| | | | | | | | | | |
|---|---|---|---|---|---|---|---|---|---|
| Resin concentration in varnish/wt % | 50 | 50 | 53 | 50 | 50 | 43 | 33 | 43 | 48 |
| Viscosity of varnish | ◎ | ◎ | ◎ | ◎ | ○ | ○ | ○ | ○ | ○ |

| | Comparative Example 1 | Comparative Example 2 | Comparative Example 3 | Comparative Example 4 | Comparative Example 5 | Comparative Example 6 |
|---|---|---|---|---|---|---|
| O-1 | — | — | — | — | — | — |
| O-2 | — | — | — | — | — | — |
| O-3 | — | — | — | — | — | — |
| O-4 | — | — | — | — | — | — |
| P-1 | 100 | — | — | — | 100 | — |
| P-2 | — | — | — | 100 | — | 100 |
| Hydrocarbon-based elastomer 1,2-PBd B3000 | — | — | 100 | — | — | — |
| Bifunctional polyphenylene ether oligomer (OPE-2St) | — | 100 | — | — | 100 | 50 |
| SEBS H-1041 | — | — | — | — | — | — |
| Solvent (toluene) | 200 | 100 | 100 | 200 | 200 | 200 |
| Curing agent dicumyl peroxide | 1 part by mass* | 1 part by mass* | 1 part by mass* | 1 part by mass* | 1 part by mass* | 1 part by mass* |
| State of cured product | Soft resin state | Hard resin state (with cracks) | Soft resin state | Soft resin state | Semi-hard resin state | Semi-hard resin state |
| Degree of crosslinking | X | ○ | ○ | ○ | ○ | ○ |
| Storage elastic modulus (300° C.)/Pa | Unmeasurable due to rupture of test piece | Unmeasured | Unmeasured | $1.0 \times 10^6$ | $2.0 \times 10^6$ | $1.7 \times 10^6$ |
| Volume resistivity/ $\Omega \cdot cm$ | $>10^{15}$ | $>10^{15}$ | $>10^{15}$ | $>10^{15}$ | $>10^{15}$ | $>10^{15}$ |
| Dielectric constant (10 GHz) | Unmeasured | Unmeasured | 2.6 | 2.2 | 2.4 | 2.5 |
| Dielectric loss tangent (10 GHz) | Unmeasured | Unmeasured | 0.005 | 0.0010 | 0.0018 | 0.0016 |
| Dielectric constant (25 to 40 GHz) | Unmeasured | Unmeasured | Unmeasured | Unmeasured | Unmeasured | Unmeasured |
| Dielectric loss tangent (25 to 40 GHz) | Unmeasured | Unmeasured | Unmeasured | Unmeasured | Unmeasured | Unmeasured |
| Coefficient of water absorption/mass % | Unmeasured | Unmeasured | Unmeasured | Unmeasured | Unmeasured | Unmeasured |
| Resin concentration in varnish/wt % | 33 | 50 | 50 | 33 | 50 | 50 |
| Viscosity of varnish | X | Unmeasured | Unmeasured | Δ | X | Δ |

*To total 100 parts by mass of raw materials other than curing agent and solvent, 1 part by mass was added.

Example 1

In a container provided with a heating/cooling jacket and a stirring blade, 0-1 (ethylene-hexene-styrene-divinylbenzene copolymerized oligomer) obtained in Synthesis Example and solvent (toluene) were heated to about 60° C. and stirred to dissolve the copolymerized oligomer. Further, 1 part by mass of the curing agent Percumyl D (dicumyl peroxide, manufactured by NOF CORPORATION) was added to 100 parts by mass of the resin composition excluding curing agent and solvent (copolymerized oligomer in Example 1) to be dissolved, and the mixture was stirred to obtain a composition in a varnish form. The resulting composition was poured into a mold (mold portion having a length of 7 cm, a width of 7 cm, and a thickness of 0.2 mm, 0.5 mm or 1.0 mm) of Teflon (registered trademark) on a PET sheet placed on a glass plate, air dried at 50° C. on a hot plate, and further dried in a vacuum dryer at 70° C. for 1 hour to obtain an uncured sheet. Further, a PET sheet was placed thereon, and the sheets were sandwiched with glass plates, and heat-treated at 120° C. for 30 minutes, 150° C. for 30 minutes, and then at 200° C. for 120 minutes in the dryer. After completion, the glass plates and the mold were removed to obtain a cured product as film in a flexible semi-hard resin state.

Examples 2 to 9, and Comparative Examples 1 to 6

In the same procedure as in Example 1, a curable resin composition was prepared according to the formulation in Table 2 (unit in the table: parts by mass), heat-treatment was performed in the same procedure, so that each of the cured products in a film state of the compositions in Examples and Comparative Examples was obtained. The conditions of the cured product in a film state were observed.

Materials Used 1,2-PBd B3000: liquid polybutadiene "B-3000" manufactured by Nippon Soda Co., Ltd., number average molecular weight: 3200, viscosity: 210 Poise (45° C.)

Bifunctional polyphenylene ether oligomer (OPE-2St): modified polyphenylene ether having a vinylbenzyl group at both ends, manufactured by Mitsubishi Gas Chemical Company, Inc., number average molecular weight: 1200

SEBS H-1041: hydrogenated styrene-based thermoplastic elastomer (SEBS), "Tuftec H-1041" manufactured by Asahi Kasei Chemicals Corporation, number average molecular weight: 58000

The uncured compositions obtained in Examples 1 to 9 were viscous liquids (in varnish form). Accordingly, the compositions were easily flowed at room temperature or by gently heating, and was adequate to application or impregnation into a porous material.

The cured products of the curable resin compositions obtained in Examples 1 to 9 were evaluated. All of the cured sheets were insoluble in boiling xylene and maintained the shape, which proved that the cross-linking sufficiently proceeded. The storage elastic moduli (300° C.) were equal to or more than a preferable value of $2\times10^6$ Pa or more.

Further, the cured products of the copolymerized oligomer alone (Examples 1, 2, 5 and 7) had a higher storage elastic modulus (300° C.) than the cured product of the copolymer alone (Comparative Example 4). A cured product of another copolymer alone in Comparative Example 1, the storage elastic modulus was unmeasurable. The cured products of the compositions containing the copolymerized oligomer had higher storage elastic moduli (300° C.) than the cured product of the composition containing the same proportion of the copolymer (Example 4 and Comparative Example 5, and Examples 6 and 8 and Comparative Example 6).

In addition, as a result of tensile test on the samples in Examples to which the component (b) was added, all had a tensile elastic modulus of less than 3 GPa and 3 MPa or more. All of the sheets had a tensile strength at break in the range of 5 MPa or more and less than 50 MPa, and a tensile elongation at break in the range of 10% or more and less than 300%. Thereby, improvement of the mechanical properties by addition of the component (b) have been proved. All the cured product of the present invention had a dielectric constant 3.0 or less and 2.0 or more, and a dielectric tangent of 0.003 or less and 0.0005 or more. All the film of cured product had a water absorption rate of less than 0.1 mass %, and a volume resistivity of $1\times10^{15}\Omega\cdot$cm or more.

The sheet of cured product of the composition obtained in Comparative Example 1 was partially dissolved in boiling xylene, and it was determined that the degree of cross-linking was insufficient. Having a too low storage elastic modulus at high temperature, the sheet of cured product in Comparative Example 1 broke at around 250° C. during measurement of the storage elastic modulus, so that the measurement at 300° C. was impossible.

The cured sheet of the composition obtained in Comparative Example 2 was hard and cracked, and subsequent various measurements were not performed.

The sheet obtained in Comparative Example 3 had a dielectric tangent out of the scope of the present invention. Accordingly, the measurement of the storage elastic modulus of the cured sheet in Comparative Example 3 was omitted.

The sheets obtained in Comparative Examples 4, 5 and 6 had a storage elastic modulus (300° C.) out of the preferred range of the present invention.

Viscosity of Varnish

The resin concentration in the varnish and the viscosity of the varnish obtained in each Example and Comparative Example are shown in the table. The measurement was performed using a rotary rheometer (MCR302: manufactured by Anton Paar) at 25° C. and a shear rate of 1 sec-1. In the table, double-circle ("@"; excellent) means less than 100 mPa·s, circle ("0"; good) means 100 or more and less than 500 mPa·s, triangle ("A"; fair) means 500 or more and less than 2000 mPa·s, and X-mark ("x"; NG) means 2000 mPa·s or more. The varnishes obtained in Examples 1 to 4 had a resin concentration of 33 mass % or more, and was determined as double-circle due to superior coatability and impregnation. The varnishes obtained in Examples 5 to 9 had a resin concentration of 33 mass % or more, and was determined as circle due to excellent coatability and impregnation. In contrast, the varnishes containing a copolymer obtained in Comparative Examples had a relatively high viscosity, and was determined to have insufficient coatability and impregnation.

The coefficient of linear thermal expansion (CTE) of the cured sheet was measured.

CTE (Coefficient of Linear Thermal Expansion)

With reference to a JPCA standard "Electronic Circuit Board Standard, Third Edition", Section 16, Material Standard for Printed Wiring Circuit Board, CTE as an average between 25° C. and 150° C. was determined from measurement with a thermomechanical analyzer (TMA: Thermomechanical Analyzer, manufactured by BRUKER AXS, currently, NETZSCH Japan K. K.) under conditions including width: 3 to 5 mm, thickness: 0.5 to 0.6 mm, chuck spacing: 15 to 20 mm, tensile load: 10 g, and temperature rise rate: 10° C./min.

The CTE values of the cured sheets obtained in Examples 2, 5 and 7, as cured products of single oligomer, were 60 ppm, 85 ppm and 100 ppm, respectively. On the other hand, the value of the cured sheet obtained in Comparative Example 1, as cured product of single copolymer, was more than 500 ppm, and the value of the sheet obtained in Comparative Example 4 was about 350 ppm.

From the above results, the cured product obtained by curing the curable resin composition of the present invention is sufficiently crosslinked and has high mechanical properties at high temperature. The cured product exhibits excellent elongation (toughness) and strength at room temperature, an elastic modulus in a specific range, as well as an excellent low dielectric constant and a low dielectric tangent value, low water absorption and high insulation. The uncured composition is in a varnish form with fluidity, has a low viscosity that allows easy application and impregnation, and may be easily formed into various shapes including a sheet by molding into various shapes and curing. In particular, the cured product may be suitably used as an electrical insulating material for high frequencies. The composition of the present invention is excellent in formability such as film forming property and moldability, from which a cured product having low dielectric constant and low dielectric loss, high volume resistance, and high mechanical strength at room temperature and high temperature, excellent in toughness (elongation) and strength, heat resistance and low water absorption may be produced.

The composition of the present invention may be used as a varnish for lamination with other members, coating, impregnation, which is then cured. Accordingly, the composition may be suitably used as an interlayer adhesive (interlayer adhesive layer) and as an interlayer insulating agent (interlayer insulating layer). The composition of the present invention may be molded into various shapes in an uncured state by drying the varnish and removing the solvent, so that, for example, an uncured sheet may be formed. The composition of the present invention may be cured and used as a printed circuit board, a flexible printed circuit board, a FCCL (flexible copper clad laminate) substrate, an interlayer adhesive layer, and an interlayer insulating layer. Further, the cured composition may be used as an insulating layer for a CCL (copper-clad laminate) circuit board and a PCB substrate. Further, the cured product of the present invention may be suitably used as a thin film electrically insulating material and an electrically insulating material for high frequency. Further, the cured product of the present invention may be suitably used as a substrate for a millimeter wave radar, an antenna member, and a wiring material.

The invention claimed is:

1. A varnish, comprising:

an olefin-aromatic vinyl compound-aromatic polyene copolymerized oligomer;

one or more selected from the group consisting of the following (a) to (c):

(a) a curing agent, (b) one or a plurality of resins selected from the group consisting of a hydrocarbon-based elastomer, a polyphenylene ether-based resin, an olefin-aromatic vinyl compound-aromatic polyene copolymer, and an aromatic polyene-based resin, and (c) a polar monomer; and a solvent, wherein the olefin-aromatic vinyl compound-aromatic polyene copolymerized oligomer satisfies all of the following conditions (1) to (4):

(1) a number average molecular weight of the copolymerized oligomer is 500 or more and less than 12000;

(2) the aromatic vinyl compound monomer is an aromatic vinyl compound having 8 or more and 20 or less carbon atoms, and a content of a unit of the aromatic vinyl compound monomer is 0 mass % or more and 90 mass % or less;

(3) the aromatic polyene is one or more selected from the group consisting of polyenes having 5 or more and 20 or less carbon atoms, and an average number of the vinyl groups and/or the vinylene groups derived from a unit of the aromatic polyene is 1.5 or more and less than 10 per oligomer, wherein the average number is determined using the number average molecular weight; and (4) the olefin is one or more selected from olefins having 2 or more and 20 or less carbon atoms, and a total of units of the olefin monomer, the aromatic vinyl compound, and the aromatic polyene monomer is 100 mass %, and wherein a cured product of the olefin-aromatic vinyl compound-aromatic polyene copolymerized oligomer alone has a storage elastic modulus at 300° C. of $1\times10^6$ Pa or more.

2. The varnish according to claim 1, wherein the varnish has at least a resin concentration of 33 mass % or more and a viscosity measured at 25° C. and 1 $sec^{-1}$ of 2000 mPa·s or less.

3. A cured product of the varnish according to claim 1.

4. A molded product, comprising:

an olefin-aromatic vinyl compound-aromatic polyene copolymerized oligomer satisfying all of the following conditions (1) to (4):

(1) a number average molecular weight of the copolymerized oligomer is 500 or more and less than 12000;

(2) the aromatic vinyl compound monomer is an aromatic vinyl compound having 8 or more and 20 or less carbon atoms, and a content of a unit of the aromatic vinyl compound monomer is 0 mass % or more and 90 mass % or less;

(3) the aromatic polyene is one or more selected from polyenes having 5 or more and 20 or less carbon atoms and having a plurality of vinyl groups and/or vinylene groups in the molecule, and an average number of the vinyl groups and/or the vinylene groups derived from a unit of the aromatic polyene is 1.5 or more and less than 10 per oligomer, wherein the average number is determined using the number average molecular weight; and (4) the olefin is one or more selected from olefins having 2 or more and 20 or less carbon atoms, and a total of units of the olefin monomer, the aromatic vinyl compound, and the aromatic polyene monomer is 100 mass %, and wherein a cured product of the olefin-aromatic vinyl compound-aromatic polyene copolymerized oligomer alone has a storage elastic modulus at 300° C. of $1\times10^6$ Pa or more.

5. The molded product according to claim 4, further comprising one or more selected from the group consisting of the following (a) to (c):

(a) a curing agent;

(b) one or a plurality of resins selected from the group consisting of a hydrocarbon-based elastomer, a polyphenylene ether-based resin, an olefin-aromatic vinyl compound-aromatic polyene copolymer, and an aromatic polyene-based resin; and (c) a polar monomer.

6. The molded product according to claim 3, further comprising one or more selected from the group consisting of the following (e) to (g):

(e) a filler;

(f) a flame retardant; and (g) a surface modifier.

7. The molded product according to claim 4, further comprising one or more selected from the group consisting of the following (e) to (g):

(e) a filler;

(f) a flame retardant; and (g) a surface modifier.

8. The cured product according to claim 3, being an electrically insulating material.

9. The cured product of the molded product according to claim 4.

10. The cured product according to claim 9, being an electrically insulating material.

11. The cured product according to claim 3, wherein the product does not contain solvent.

12. The cured product according to claim 9, wherein the product does not contain solvent.

13. An electrically insulating material, comprising the cured product according to claim 3.

14. An electrically insulating material, comprising the cured product according to claim 9.

15. A CCL circuit board, an FCCL circuit board, an interlayer insulating layer or an interlayer adhesive layer, comprising the cured product according to claim 3.

16. A CCL circuit board, an FCCL circuit board, an interlayer insulating layer or an interlayer adhesive layer, comprising the cured product according to claim 9.

17. A cured product, comprising:

an olefin-aromatic vinyl compound-aromatic polyene copolymerized oligomer, as a product of a reaction using a single-site-coordinated polymerization catalyst composed of a transition metal compound represented by the following general formula (1) and a co-catalyst:

Chemical Formula 1

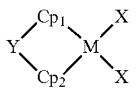

(1)

wherein M is zirconium or hafnium;

Cp1 and Cp2 are cyclopentadienyl groups having no substituent, or cyclopentadienyl groups having one or two alkyl substituents having no cyclic structure; the Cp1 and Cp2 are the same or different from each other; one of the Cp1 and Cp2 groups is optionally an indenyl group having no substituent, or an indenyl group having one or two alkyl substituents having no cyclic structure;

Y is carbon, silicon, germanium or boron having a bond with Cp1 and Cp2 and having a hydrogen atom or a substituent; the substituents are different from each other or the same, and optionally have a cyclic structure;

X is selected from the group consisting of hydrogen, halogens, alkyl groups and aryl groups, or two X are bonded to each other to form a diene group, and wherein a cured product of the olefin-aromatic vinyl compound-aromatic polyene copolymerized oligomer alone has a storage elastic modulus at 300° C. of $1\times10^6$ Pascals (Pa) or more.

18. A method for manufacturing a varnish, the method comprising the steps of:

obtaining an olefin-aromatic vinyl compound-aromatic polyene copolymerized oligomer, as a product of a reaction using a single-site-coordinated polymerization catalyst composed of a transition metal compound represented by the following general formula (1) and a co-catalyst:

Chemical Formula 1

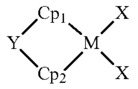

(1)

wherein M is zirconium or hafnium;

Cp1 and Cp2 are cyclopentadienyl groups having no substituent, or cyclopentadienyl groups having one or two alkyl substituents having no cyclic structure; the Cp1 and Cp2 are the same or different from each other; one of the Cp1 and Cp2 groups is optionally an indenyl group having no substituent, or an indenyl group having one or two alkyl substituents having no cyclic structure;

Y is carbon, silicon, germanium or boron having a bond with Cp1 and Cp2 and having a hydrogen atom or a substituent; the substituents are different from each other or the same, and optionally have a cyclic structure;

X is selected from the group consisting of hydrogen, halogens, alkyl groups and aryl groups, or two X are bonded to each other to form a diene group; and adding a solvent to the olefin-aromatic vinyl compound-aromatic polyene copolymerized oligomer to prepare a varnish, and wherein a cured product of the olefin-aromatic vinyl compound-aromatic polyene copolymerized oligomer alone has a storage elastic modulus at 300° C. of $1\times10^6$ Pascals (Pa) or more.

19. A method for manufacturing a cured product of the varnish obtained by the method according to claim 18, the method comprising the steps of:

adding a peroxide to the varnish; and curing the varnish.

20. The method according to claim 19, further comprising:

removing the solvent from the varnish.

21. A cured product of a varnish, wherein the cured product has a storage elastic modulus of $2.5\times10^6$ Pa or more at 300° C., and wherein the cured product has a dielectric constant of 2.5 or less and 2.0 or more and a dielectric loss tangent of 0.003 or less and 0.0005 or more as measure at 23° C. and 10 GHz.

* * * * *